United States Patent
Ford et al.

(10) Patent No.: US 6,761,296 B2
(45) Date of Patent: Jul. 13, 2004

(54) CONVERTIBLE LADDER AND LOAD PLATFORM FOR A VEHICLE ARTICULATING ROOF RACK SYSTEM

(75) Inventors: Michael Ford, Ypsilanti, MI (US); Noah Barlow Mass, Ann Arbor, MI (US); Noel Ranka, Canton, MI (US); Travis Steven Garland, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 10/063,539

(22) Filed: May 2, 2002

(65) Prior Publication Data

US 2003/0205597 A1 Nov. 6, 2003

(51) Int. Cl.[7] ............................................. B60R 9/00
(52) U.S. Cl. ..................... 224/310; 224/319; 224/328
(58) Field of Search .................. 224/310, 319, 224/328, 330; 414/462

(56) References Cited

U.S. PATENT DOCUMENTS

| | | | |
|---|---|---|---|
| 2,646,891 A | 7/1953 | Morgan | |
| 3,672,549 A | 6/1972 | Ghorey | |
| 3,732,829 A | 5/1973 | Bech | |
| 4,874,211 A | 10/1989 | Nichols | |
| 4,953,757 A | 9/1990 | Stevens et al. | |
| 5,544,796 A | * 8/1996 | Dubach | 224/310 |
| 5,762,245 A | 6/1998 | Hurst | |
| 6,015,074 A | * 1/2000 | Snavely et al. | 224/310 |
| 6,234,371 B1 | * 5/2001 | Sinn | 224/328 |
| 6,308,874 B1 | * 10/2001 | Kim et al. | 224/310 |
| 6,338,427 B1 | * 1/2002 | Aftanas et al. | 224/310 |
| 6,427,888 B1 | * 8/2002 | Condon et al. | 224/310 |

FOREIGN PATENT DOCUMENTS

DE          3319107 A1     11/1984

* cited by examiner

Primary Examiner—Gregory Vidovich
Assistant Examiner—Maerena W. Brevard
(74) Attorney, Agent, or Firm—Gigette Bejin

(57) ABSTRACT

The present invention provides a convertible ladder and load platform including a vehicle articulating roof rack system having a selectively removable portion operable between a stowed roof mounted position and a slideably and pivotally repositionable back end mounted position, a stationary bottom portion received by the selectively removable portion of the articulating roof rack system, a removable top portion received by the stationary bottom portion, a frame received by the stationary bottom portion, and a plurality of rotatable steps operable between a vertically oriented ladder position and a horizontally oriented load platform position received by the frame.

21 Claims, 5 Drawing Sheets

US 6,761,296 B2

CONVERTIBLE LADDER AND LOAD PLATFORM FOR A VEHICLE ARTICULATING ROOF RACK SYSTEM

BACKGROUND OF INVENTION

1. Field of the Invention

The present invention relates to ladders and platforms, and more specifically, a convertible ladder and load platform for a vehicle articulating roof rack system.

2. Background of the Invention

An articulating roof rack system provides a new level of utility not seen in current roof rack systems. The system is operatively deployed upon a vehicle and is selectively movable to allow a user to easily and quickly load and unload items to and from the assembly. As such, a portion of the roof rack assembly is selectively removable from the roof, thereby allowing the user to access the assembly from ground level.

To allow for the selectively removable portion of the roof rack assembly to be repositioned, the system provides for support members in combination with cross members to be slideably and pivotally repositionable upon the back end of the vehicle such that the assembly is in a back end mounted position, resulting in the assembly being substantially parallel with the back end of the vehicle. In this back end position, the user can easily load and unload items from ground level without the use of a ladder or the like.

While the roof rack system provides for easy operator loading and unloading and access from ground level, its purpose is to securely store and hold items that are not currently in use. In such vehicles where the articulating roof rack system would be used, typically sport utility vehicles and the like, there is a need for increased utility of external vehicle components. An operator may desire, for example, to have the roof rack system in a back end mounted position while still requiring access to the roof of the vehicle or an operator may desire a loading surface on the roof of the vehicle when the roof rack system is in a roof mounted position.

It is therefore desired to have a convertible ladder and load platform for a vehicle articulating roof rack system such that when in the back end mounted position the convertible ladder and load platform can be attached to the system to serve as a ladder for access to the roof of the vehicle, and when in the roof mounted position the convertible ladder and load platform can be attached to the system to serve as a load platform thereby creating a flat loading surface on the roof of the vehicle.

SUMMARY OF INVENTION

It is an object of the present invention to provide a convertible ladder and load platform for a vehicle articulating roof rack system that overcomes the disadvantages of the prior art.

Accordingly, the present invention advantageously provides a convertible ladder and load platform including a vehicle articulating roof rack system having a selectively removable portion operable between a stowed roof mounted position and a slideably and pivotally repositionable back end mounted position, a stationary bottom portion received by the selectively removable portion of the articulating roof rack system, a removable top portion received by the stationary bottom portion, a frame received by the stationary bottom portion, and a plurality of rotatable steps operable between a vertically oriented ladder position and a horizontally oriented load platform position received by the frame.

It is a feature of the present invention that the convertible ladder and load platform for a vehicle articulating roof rack system has steps that rotate such that when in the substantially vertical ladder position the shelves serve as steps, and when in the horizontal load platform position the shelves articulate forward thereby creating a flat loading surface on the roof of the vehicle.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
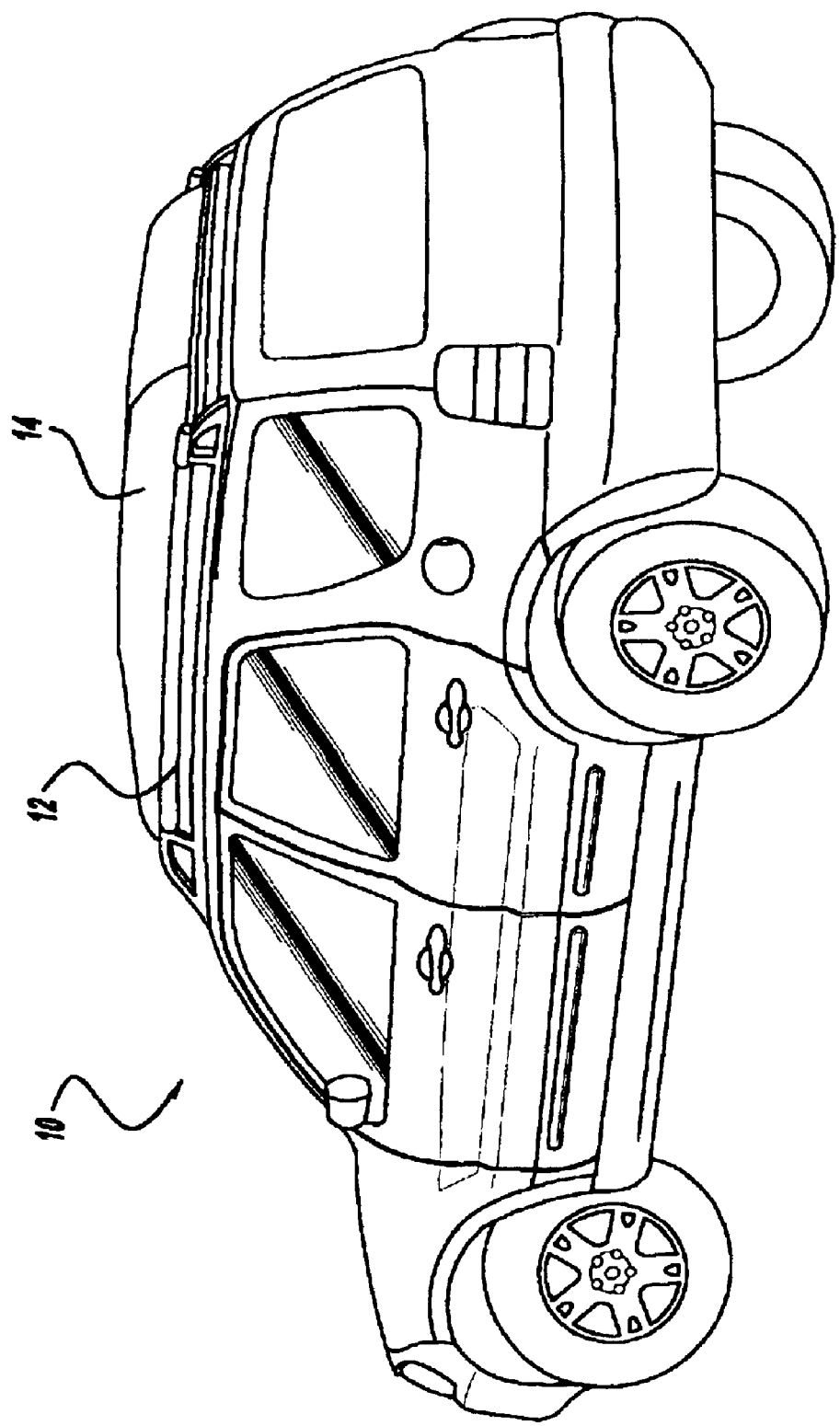
FIG. 1 is a perspective view of a convertible ladder and load platform on an articulating roof rack system of a vehicle in a horizontal load platform position according to the present invention.

Referring to FIG. 1, a vehicle 10 having an articulating roof rack system 12 on which there is a convertible ladder and load platform 14 is shown. Although not limited to such, the vehicle 10 which has such a rack system 12 is typically a sport utility vehicle or the like. Here, the articulating roof rack system 12 is in a roof mounted position. As such, the convertible ladder and load platform 14 is in a horizontal load platform position.

Figure 2:
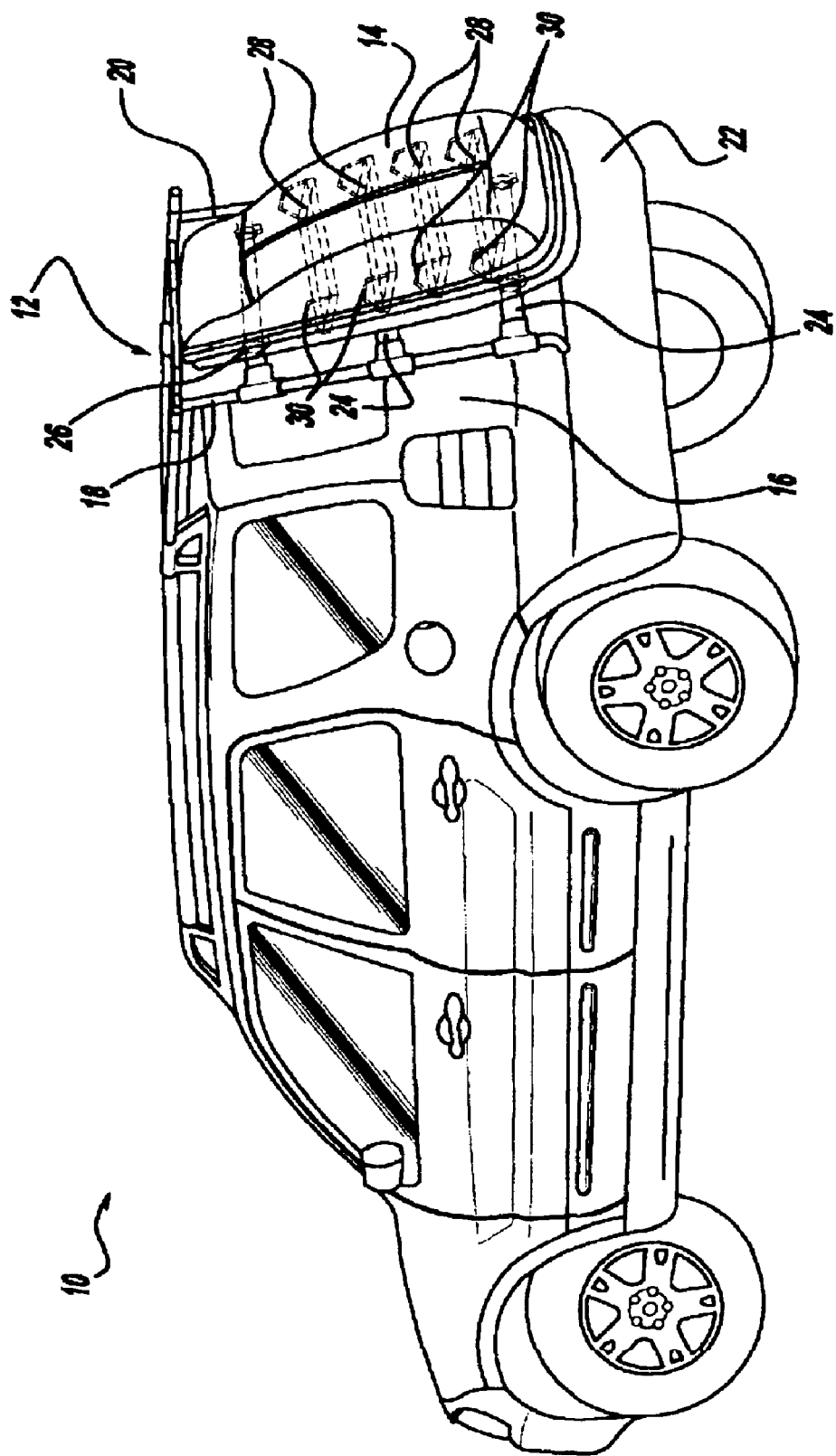
FIG. 2 is a perspective view of a convertible ladder and load platform on an articulating roof rack system of a vehicle in a substantially vertical ladder position according to the present invention.

A selectively removable portion of the articulating roof rack system 12 is slideably and pivotally repositionable upon a back end 16 of the vehicle 10, as seen in FIG. 2. The rack system 12 has left and right support members, 18 and 20 respectively, that are slideably and pivotally repositionable upon the back end 16 of the vehicle 10. The left and right support members 18 and 20 are tubular shaped and extend substantially the height of the back end 16 of the vehicle 10 when in this back end mounted position, excluding a rear bumper 22.

The roof rack system 12 also has a plurality of tubular shaped cross members 24 each received by both the left and right support members 18 and 20 such that they are perpendicular to said support members 18 and 20. The plurality of cross members 24 are spaced a predetermined distance apart. The left and right support members 18 and 20 in combination with the cross members 24 form the articulating roof rack system 12 which, in its entirety, extends a predetermined width of the back end 16 of the vehicle 10 when in this back end mounted position.

The convertible ladder and load platform 14 is attached to the system 12 by using crossbar mounts 26, such as what are currently used for bicycle and cargo carriers, which attach to the cross members 24 of the system 12. A feature of the convertible ladder and load platform 14 is that when not in use, it can be removed from the vehicle 10 altogether. Here in FIG. 2, the convertible ladder and load platform 14 is in a substantially vertical ladder position.

A plurality of steps 28 can be seen here, thus creating a ladder for an operator to access the roof of the vehicle 10. The steps 28 can be locked in place via internal locking mechanisms. The steps 28 also serve as shelves when the convertible ladder and load platform 14 is in this position. As such, the steps 28 can be loaded with various cargo such as outdoor items, groceries, or the like. The steps 28 can then be unlocked, and as the articulating roof rack system 12 and the convertible ladder and load platform 14 are rotated upward and slid into the roof mounted and horizontal load platform position as seen in FIG. 1, the steps 28 rotate forward due to gravity via pivot rods 30 and thus keep the cargo upright. The steps 28 can then be relocked to restrict any movement while the vehicle 10 is in motion. Conversely, when the steps 28 are unlocked and the articulating roof rack system 12 and the convertible ladder and load platform 14 are lowered into the back end mounted position, the steps 28 pivot rearward thus keeping themselves, and their items, upright.

Figure 3:
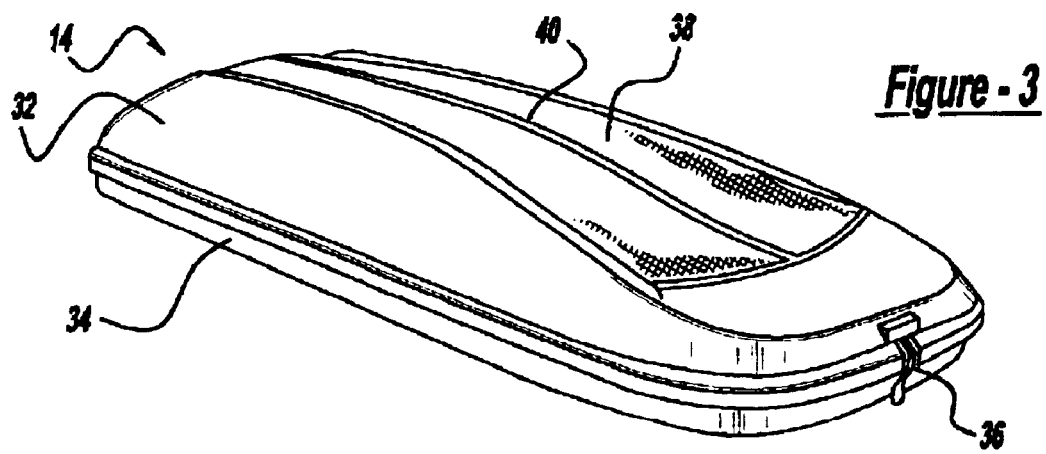
FIG. 3 is a perspective view of a convertible ladder and load platform according to the present invention.

A closer look at the convertible ladder and load platform 14 can be seen in FIG. 3. The convertible ladder and load platform 14 is made of plastic and is substantially rectangular shaped. The convertible ladder and load platform 14 has a top portion 32 and a bottom portion 34 that are held together via a latch 36. The top portion 32 is angled downward toward the front such that when the convertible ladder and load platform 14 and the articulating roof rack system 12 are in the roof mounted position, the surface of the top portion 32 is optimally aerodynamic. The top portion 32 has a nylon, or the like, cloth portion 38, preferably breathable, with a zipper 40 extending the length of the material. When access to the steps 28 is desired, the latch 36 is unfastened and the top portion 32 is removed for operator use of the ladder, or the zipper 40 is unzipped and the cloth portion 38 is opened for use of the shelves as a load platform.

Figure 4:
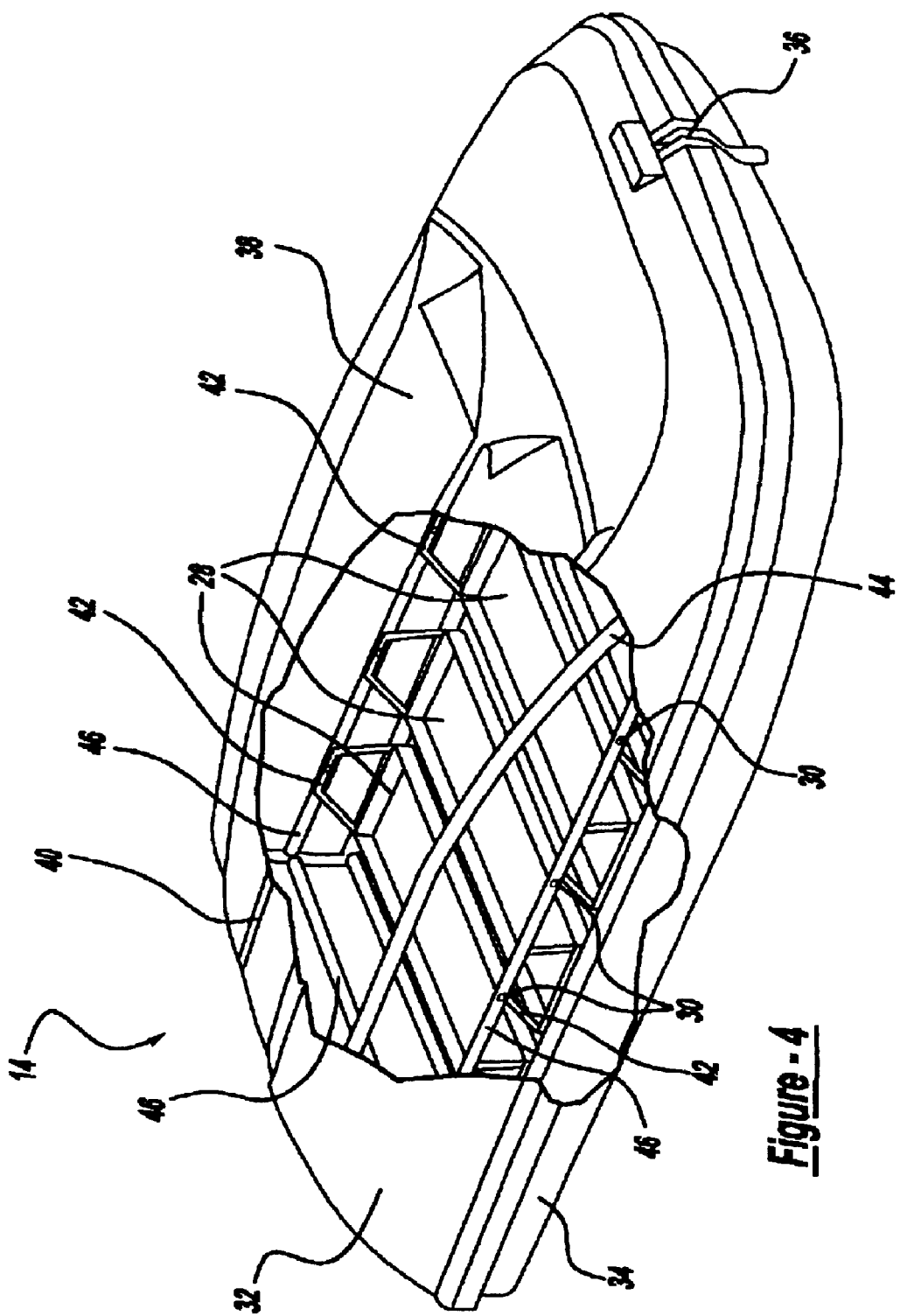
FIG. 4 is a perspective cutaway view of a convertible ladder and load platform according to the present invention.

FIG. 4 shows a cutaway view of the convertible ladder and load platform 14. As seen here in this horizontal load platform position, the steps 28 have rotated forward about pivot rods 30 such that they are now in a flat surface load platform position. The steps 28 have textured rubberized surfaces so as to reduce slippage. An added feature is that the steps 28 can be removed from the convertible ladder and load platform 14 if desired. The steps 28 themselves are cast aluminum or plastic.

The steps 28 are used in conjunction with the pivot rods 30 via use of end caps 42. The pivot rods 30 are attached to the end caps 42 which are attached to the steps 28 to allow for rotation of the steps 28. The end caps 42 are of similar material as the steps 28. The pivot rods 30 are supported by an aluminum frame 44 that is inside the convertible ladder and load platform 14.

Figure 5:
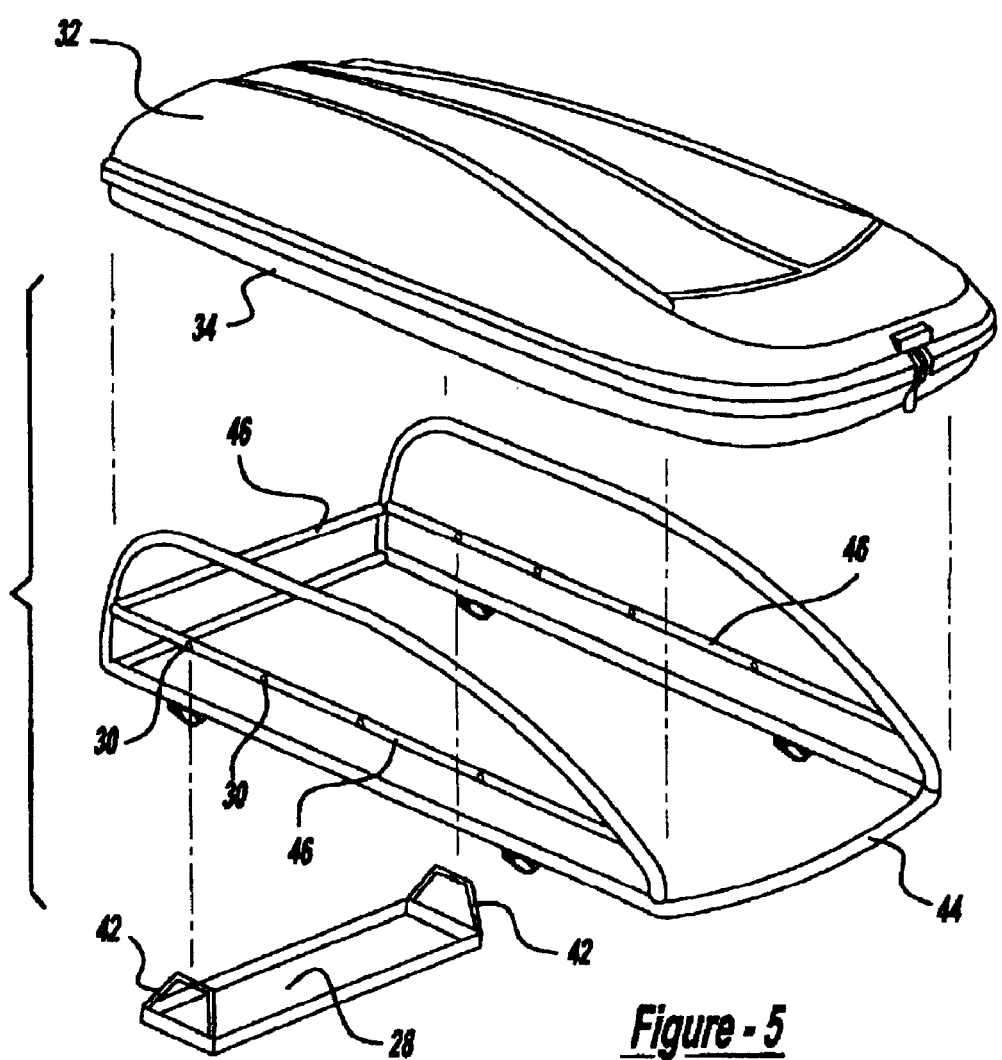
FIG. 5 is a perspective exploded view of a convertible ladder and load platform according to the present invention.

A closer look at the frame 44 can be seen in the exploded view of the convertible ladder and load platform 14 in FIG. 5. As seen here, the aluminum frame 44 defines the overall shape of the convertible ladder and load platform 14. On the sides and back of the frame 44 there are support rails 46 which are a predetermined distance between the top and bottom of the frame 44. These support rails 46 hold the pivot rods 30 and thus the end caps 42 and the steps 28.

Figure 6:
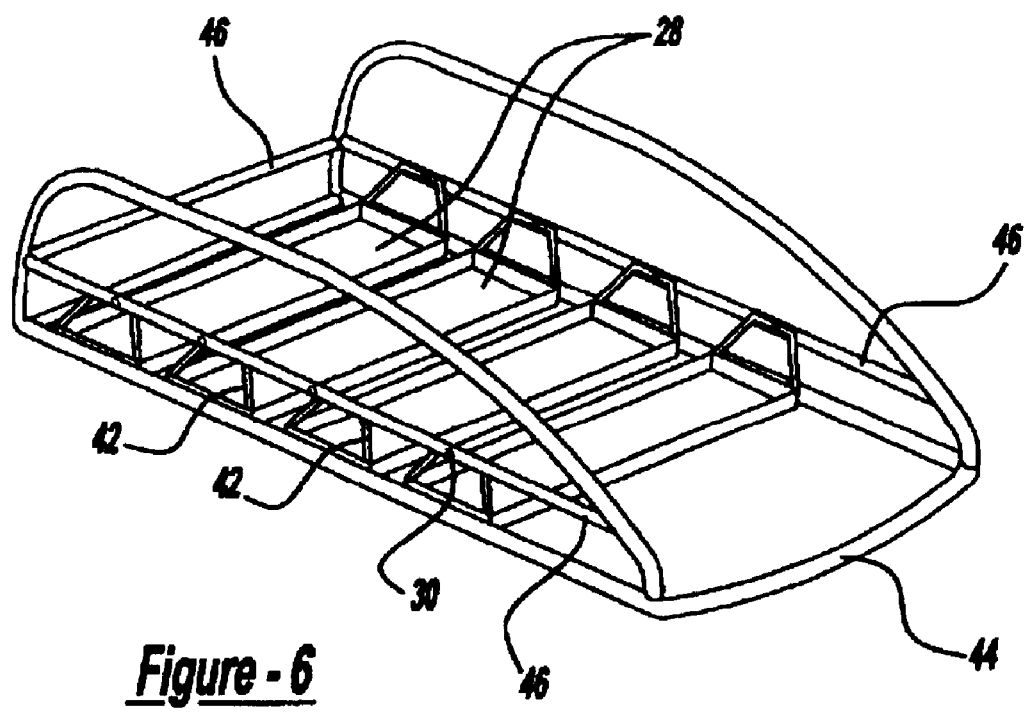
FIG. 6 is a perspective view of the frame of a convertible ladder and load platform according to the present invention.

A view of the framework of the convertible ladder and load platform 14 is best seen in FIG. 6. Here, the steps 28 can be seen supported by the pivot rods 30 via use of end caps 42. In this position, the steps 28 serve as a flat load platform to hold cargo. It can be seen here that as the articulating roof rack system and the convertible ladder and load platform 14 are moved into a back end mounted position, the steps 28 articulate rearward about the pivot rods 30 such that the steps 28 are now in a ladder position as seen in FIG. 2.

While only one embodiment of the convertible ladder and load platform of the present invention has been described, others may be possible without departing from the scope of the following claims.

What is claimed is:

1. A convertible ladder and load platform comprising:
    a vehicle articulating roof rack system having a selectively removable portion operable between a stowed roof mounted position and a slideably and pivotally repositionable back end mounted position;
    a stationary bottom portion received by the selectively removable portion of the articulating roof rack system;
    a removable top portion received by the stationary bottom portion;
    a frame received by the stationary bottom portion; and
    a plurality of rotatable steps operable between a vertically oriented ladder position and a horizontally oriented load platform position received by the frame.

2. The convertible ladder and load platform as defined in claim 1, wherein the selectively removable portion of the articulating roof rack system has two support members a predetermined length and a plurality of cross members a predetermined length and a predetermined distance apart.

3. The convertible ladder and load platform as defined in claim 1, wherein the stationary bottom portion is detachably received by the selectively removable portion of the articulating roof rack system.

4. The convertible ladder and load platform as defined in claim 1, wherein the removable top portion has a cloth portion with a zipper to allow for access to the steps without removing the top portion.

5. The convertible ladder and load platform as defined in claim 1, wherein the steps are detachably received by the frame.

6. The convertible ladder and load platform as defined in claim 1, wherein the steps have a textured rubberized surface.

7. The convertible ladder and load platform as defined in claim 1, wherein the steps are a predetermined distance apart.

8. The convertible ladder and load platform as defined in claim 1, wherein the steps can be locked when in the vertical ladder position or when in the horizontal load platform position.

9. A convertible ladder and load platform comprising:
    a vehicle articulating roof rack system having a selectively removable portion operable between a stowed roof mounted position and a slideably and pivotally repositionable back end mounted position;
    a stationary bottom portion detachably received by the selectively removable portion of the articulating roof rack system;
    a removable top portion received by the stationary bottom portion;
    a frame received by the stationary bottom portion; and a plurality of rotatable steps operable between a vertically oriented ladder position and a horizontally oriented load platform position received by the frame.

10. The convertible ladder and load platform as defined in claim 9, wherein the selectively removable portion of the articulating roof rack system has two support members a predetermined length and a plurality of cross members a predetermined length and a predetermined distance apart.

11. The convertible ladder and load platform as defined in claim 9, wherein the removable top portion has a cloth portion with a zipper to allow for access to the steps without removing the top portion.

12. The convertible ladder and load platform as defined in claim 9, wherein the steps are detachably received by the frame.

13. The convertible ladder and load platform as defined in claim 9, wherein the steps have a textured rubberized surface.

14. The convertible ladder and load platform as defined in claim 9, wherein the steps are a predetermined distance apart.

15. The convertible ladder and load platform as defined in claim 9, wherein the steps can be locked when in the vertical ladder position or when in the horizontal load platform position.

16. A convertible ladder and load platform comprising:
a vehicle articulating roof rack system having a selectively removable portion operable between a stowed roof mounted position and a slideably and pivotally repositionable back end mounted position;
a stationary bottom portion detachably received by the selectively removable portion of the articulating roof rack system;
a removable top portion received by the stationary bottom portion;
a frame received by the stationary bottom portion; and
a plurality of detachable rotatable steps operable between a vertically oriented ladder position and a horizontally oriented load platform position received by the frame.

17. The convertible ladder and load platform as defined in claim 16, wherein the selectively removable portion of the articulating roof rack system has two support members a predetermined length and a plurality of cross members a predetermined length and a predetermined distance apart.

18. The convertible ladder and load platform as defined in claim 16, wherein the removable top portion has a cloth portion with a zipper to allow for access to the steps without removing the top portion.

19. The convertible ladder and load platform as defined in claim 16, wherein the steps have a textured rubberized surface.

20. The convertible ladder and load platform as defined in claim 16, wherein the steps are a predetermined distance apart.

21. The convertible ladder and load platform as defined in claim 16, wherein the steps can be locked when in the vertical ladder position or when in the horizontal load platform position.

* * * * *